(12) United States Patent
Cen

(10) Patent No.: US 7,669,778 B2
(45) Date of Patent: Mar. 2, 2010

(54) AUTO CREEPER TREAD

(75) Inventor: Shiwei Cen, Guangdong Province (CN)

(73) Assignee: Shenzhen Cess Tech Co., Ltd, Shenzhen (CN)

( * ) Notice: Subject to any disclaimer, the term of this patent is extended or adjusted under 35 U.S.C. 154(b) by 122 days.

(21) Appl. No.: 12/013,484

(22) Filed: Jan. 14, 2008

(65) Prior Publication Data
US 2009/0025844 A1 Jan. 29, 2009

(30) Foreign Application Priority Data
Jul. 27, 2007 (CN) .................... 2007 2 0128313 U

(51) Int. Cl.
*E01B 23/00* (2006.01)
(52) U.S. Cl. ...................................... 238/14
(58) Field of Classification Search .................. 238/14; 180/9, 9.1; 152/167, 170, 171, 172, 173, 152/175, 185, 187, 208, 209.1, 209.17, 221, 152/222, 225 R; 404/35, 36
See application file for complete search history.

(56) References Cited

U.S. PATENT DOCUMENTS

| 3,342,414 A | * | 9/1967 | Jureit | 238/14 |
| 3,749,309 A | * | 7/1973 | Becker | 238/14 |
| 4,210,280 A | * | 7/1980 | Reisner | 238/14 |
| 4,346,748 A | * | 8/1982 | Bagoy et al. | 152/222 |
| 4,351,380 A | * | 9/1982 | Pilliod et al. | 152/169 |
| 4,361,277 A | * | 11/1982 | Cannady et al. | 238/14 |
| 4,998,670 A | * | 3/1991 | Peterson | 238/14 |
| 5,439,171 A | * | 8/1995 | Fruend | 238/14 |
| 5,538,183 A | * | 7/1996 | McGee | 238/14 |
| 6,779,738 B1 | * | 8/2004 | Stannard | 238/14 |

\* cited by examiner

*Primary Examiner*—Mark T Le

(57) ABSTRACT

An auto creeper tread has the following features: three or four rows of circular holes disposed in an orderly manner on a skid-proof pad, wherein, the edge of each of the circular holes protrudes outwards; two rows of rectangular holes disposed on two sides of the skid-proof pad; two protruding reinforcing grooves disposed in the middle of the skid-proof pad; a row of small circular holes disposed on each of the two ends of the skid-proof pad; a track connected to the skid-proof pad by rivets; and a tire lock connected to one end of the track with a clamping plate. The auto creeper tread is designed to provide anti-sink and anti-skid solutions for automobiles.

2 Claims, 1 Drawing Sheet

AUTO CREEPER TREAD

BACKGROUND OF THE INVENTION

The present invention relates to a self-rescue apparatus for automobiles and more particularly pertains to an auto creeper tread used for automobile self-rescue.

At present, automobiles usually get stuck or trapped in the following terrains: deserts, swamps, muddy roads and snow. Automobiles usually skid or sink into the ground when they get stuck. In situations when automobiles get stuck into the ground and cannot make an escape, drivers could only seek help from other automobiles to give it a tow. Sometimes, if the incident occurs in a remote area far away from people or towns, drivers would be susceptible to intolerable distress, delay in schedule and disturbance in work. It is most common to make an escape by means of tow truck. Towing is advantageous in that it is simple and easy to perform as it only requires one other automobile and a trailer rope. To prevent an automobile from getting stuck, a metal chain in the form of continuous enclosed rings can be mounted onto the surface of an automobile tire to form an anti-skid chain so as to increase the adhesive force of the tire towards the ground. It is one of the most effective measures to prevent an automobile from skidding on plain snowy roads and muddy roads. It is deficient in that it is useless if the automobile sinks into a deeper pit or if any of the tires loses contact with the ground.

Self-rescuing apparatus for automobiles generally includes winches, differential locks and antiskid plate.

1. Winches

The operating principle of a winch is to use a generator or a PTO power output to drive a gear cluster to reel a steel cable in order to tow the automobile out. The largest traction generated by a winch is 9,500-12,000 pounds, which is two to four times the weight of a common automobile. A winch costs about RMB 5,000 to RMB 20,000. The advantage of a winch is that it has a large torque and a high successful rate. Its disadvantage is that it must have an anchor point. In other words, there must be another vehicle, a tree or other fixed objects within a distance of 30 to 50 meters for the winch hook to hook onto, and the anchor point must be right in front of the automobile. Anchor points could also be constructed by integral ground anchors or tires buried deep into the ground. However, it requires much effort and is easily susceptible to failure due to the soft soil texture at the position of the anchor point. Moreover, a large number of accessories such as tree strap, pulley assembly, U-shaped hook and leather gloves are required when using a winch. Users are also required to master certain skills.

An electric winch can only continuously operate for several minutes. Therefore, it is necessary to reduce as much as possible the rotating time of a winch, or the generator would be damaged due to overheating or the accumulator cell would be subjected to over discharge. A winch is usually installed in the middle of a bumper in front of the head of an automobile. As a winch weighs 30 kilograms, the head of the automobile would sink downward. It is therefore necessary to improve shock absorption. If an automobile has to be towed from its back occasionally, another winch has to be installed at the tail of the automobile. Another disadvantage is that a sufficient safe space in front of or behind the automobile to be rescued is required for placing an anchor point. However, there is no guarantee to have such a large empty area at places where automobiles easily get stuck.

2. Differential Lock

The operating principle of a differential lock is to lock the differential so that power could be evenly applied to each tire, thereby preventing all power from being applied to the spinning tire as the other tire loses contact with the ground. It is advantageous in that it can be operated without the need of any person getting out of the automobile, and that it performs well on wet and slippery roads. Differential lock is deficient in that it can only be used on wet and slippery roads. When the automobile gets on dry and firm roads, it is necessary to disengage the differential lock immediately, or the gears would be damaged. Moreover, when the tires of the automobile lose contact with the ground and the chassis of the automobile is lifted, a differential lock could not help much with the rescue.

A set of differential locks costs about RMB 10,000 to RMB 20,000 in general. Only a minority of luxurious four-wheel drive automobiles are equipped with differential locks. Currently, the majority of automobiles are not designed for the installation of differential locks. Therefore, differential locks are not common rescuing tools.

3. Antiskid Plate

An antiskid plate is formed by processing metal boards or hard plastic boards having mesh openings or screw lines. By placing an antiskid plate between the ground and the tires, friction is increased and the automobile could be pulled out of the area where it gets stuck. It is advantageous in that it is effective if the ground is firm and the automobile is not sinking deep into the ground. It is also convenient to carry and simple to use. Its disadvantage is that it becomes useless when the automobile sinks deep into the ground, especially when the chassis of the automobile is being lifted and thereby causing the tires to lose contact with the ground.

There are also some patented inventions which utilize the principle of antiskid plates by installing larger accessories on an antiskid plate to generate more friction. These inventions appear to be feasible theoretically. However, when an automobile sinks deeper into the ground, especially when the chassis of the automobile is being lifted and thereby causing the tires to lose contact with the ground, the friction generated between the antiskid plate and the tires is far from being able to overcome the resistance generated by the adhesion of the automobile towards the slough, snow and sand. Such resistance is usually equal to or greater than the weight of an automobile. Depending on the ratio between the depth of the sinkage and the surface area of the ground, the resistance varies from several hundred kilograms to several tons or more. There was once an automobile which is towed by an industrial hoister after it sinks into a sandy ground and fails to be rescued by a winch offered by another vehicle. The automobile was unable to be retrieved despite that the casing and the chassis thereof are substantially detached from each other. It is even impossible for relevant anti-sink devices derived from antiskid plate to generate sufficient traction to get the automobile out of the area where it gets stuck.

BRIEF SUMMARY OF THE INVENTION

The object of the present invention is to provide an auto creeper tread which provides a solution for anti-sink and anti-skid problems on dangerous roads came across by automobiles without the need to seek traction force from a third party. The automobile can rely on its own power to get itself out from the area where it gets stuck. An auto creeper tread comprising a rectangular skid-proof pad and a bar-shaped track designed according to the width of an automobile wheel. Three or four rows of circular holes are disposed in an orderly manner on the skid-proof pad. The edge of each of the circular holes protrudes outwards (so as to increase the friction between the skid-proof pad and the ground, and between the skid-proof pad and the tires). The three or four rows of circular holes also reduce the weight of the skid-proof device. Two rows of rectangular holes are disposed on two sides of the skid-proof pad for engaging the skid-proof pad to the automobile conveniently and also to reduce the weight of the skid-proof pad. Two protruding reinforcing grooves are disposed in the middle of the skid-proof pad to prevent skid-proof pad from being bent or deformed due to excessive power of the automobile. A row of small circular holes are disposed on each of the two ends of the skid-proof pad for fastening the track. The track is a Tetoron fabric strap of high strength and wear resistance. The other end of the track is disposed with a clamping plate which is engaged with the track by means of rivets. The front end of the clamping plate is engaged with a tire lock. To use the present invention, (1) place an end of the track on top of the small circular holes of the skid-proof pad and then fasten with a press plate and fix together by means of rivets; (2) place the tire lock through the hubs of the wheel and fasten the lock; (3) place the end of the skid-proof pad which is engaged with the track to the gap between the tire and the ground and then start the automobile, and the track is slowly rolled underneath the tire utilizing the rotating force of the tire. The automobile could then get out of the pit along the skid-proof pad. The tire lock can then be unlocked and the skid-proof pad and the track can be retrieved. If the area where the automobile gets stuck is of a long distance, the user does not need to unlock the tire lock. Instead, user can press the pad and the track by the tire and flip the same to the front of the automobile, and then continue to insert the pad under the tire and start the automobile. Repeating said steps could get the automobile unstuck.

The auto creeper tread is a portable accessory for automobiles. When an automobile gets stuck, it could quickly get the automobile out from the area where it gets stuck. When it is not in use, the skid-proof pad can serve as a resting pad for drivers and passengers. It can also serve as a temporary pad for repairing an automobile.

DETAILED DESCRIPTION OF THE INVENTION

Figure 1:
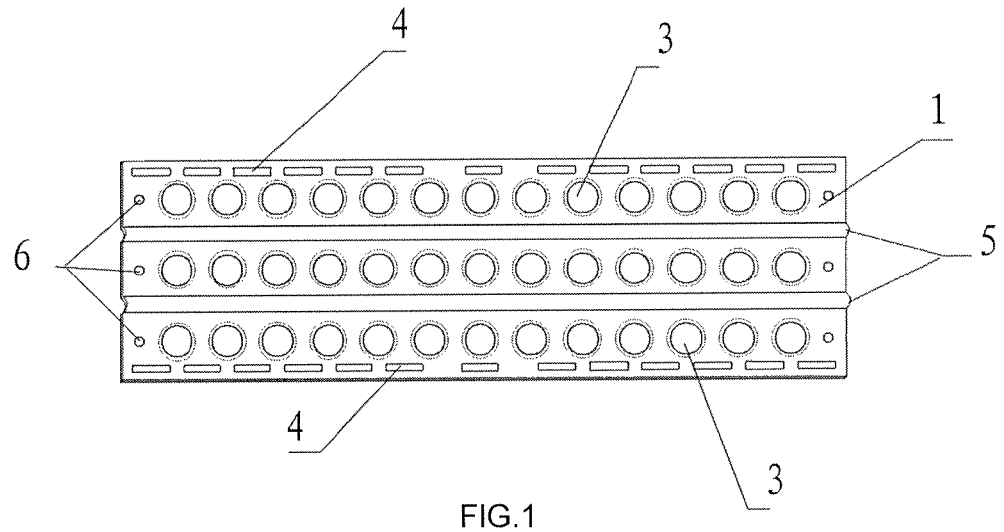
FIG. 1 is a top plan view of the skid-proof pad.
Figure 2:
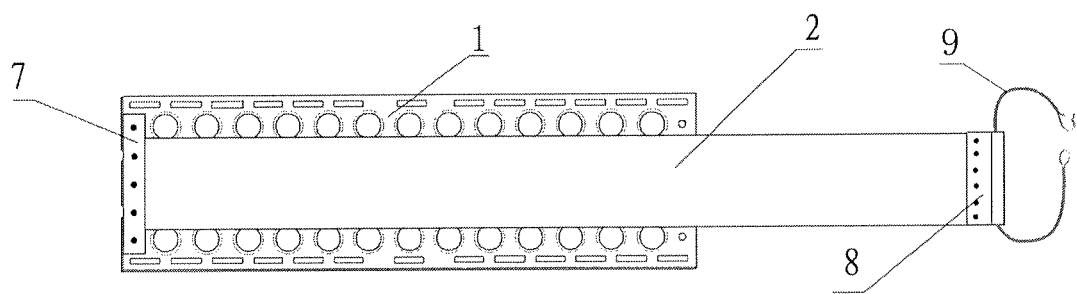
FIG. 2 illustrates the connection between the skid-proof pad and the track.

As illustrated in the accompanying drawings, the present invention is an auto creeper tread which comprises a rectangular skid-proof pad 1 and a bar-shaped track 2 designed according to the width of an automobile wheel. Three or four rows of circular holes 3 are disposed in an orderly manner on the skid-proof pad 1. The edge of each of the circular holes 3 protrudes outwards. Two rows of rectangular holes 4 are disposed on two sides of the skid-proof pad 1. Two protruding reinforcing grooves 5 are disposed in the middle of the skid-proof pad 1. A row of small circular holes 6 are disposed on each of the two ends of the skid-proof pad 1. The track 2 is a Tetoron fabric strap of high strength and wear resistance. The track 2 is engaged with the skid-proof pad 1 by placing an end of the track 2 on top of the small circular holes 6 of the skid-proof pad 1, fastening with a press plate 7 and fixed by means of rivets. The other end of the track 2 is disposed with a clamping plate 8 which is engaged with the track 2 by means of rivets. The front end of the clamping plate 8 is engaged with a tire lock 9. In other embodiments, the track 2 can be engaged with the skid-proof pad 1 by placing an end of the track 2 on top of the small circular holes 6 of the skid-proof pad 1, fastening with a press plate 7 and fixed by means of screws and screw nuts. The other end of the track 2 is disposed with a clamping plate 8 which is engaged with the track 2 by means of rivets. The front end of the clamping plate 8 is engaged with a tire lock 9. The skid-proof pad has a length of 100 cm and a width of 30 cm. The track has a length of 150 cm and a width of 16 cm.

What is claimed is:

1. An auto creeper tread which comprises a rectangular skid-proof pad (1), wherein it additionally comprises a bar-shaped track (2); three or four rows of circular holes (3) disposed in an orderly manner on the skid-proof pad (1) with edge of each of the circular holes (3) being protruded outwards: two rows of rectangular holes (4) disposed on two sides of the skid-proof pad (1); two protruding reinforcing grooves (5) disposed in middle of the skid-proof pad (1); and a row of small circular holes (6) disposed on each of two ends of the skid-proof pad (1); the track (2) is a fabric strap of high strength and wear resistance, and the track (2) is engaged with the skid-proof pad (1) by placing an end of the track (2) on top of the small circular holes (6) of the skid-proof pad (1), fastening with a press plate (7) and fixing by means of rivets; the other end of the track (2) is disposed with a clamping plate (8) which is engaged with the track (2) by means of rivets; a front end of the clamping plate (8) is engaged with a tire lock (9).

2. The auto creeper tread as in claim 1, wherein said fixing by means of rivets further includes screw nuts.

\* \* \* \* \*